T. V. BUCKWALTER.
ANTIFRICTION BEARING.
APPLICATION FILED JAN. 24, 1919.

1,437,833.

Patented Dec. 5, 1922.

Inventor:
Tracy V. Buckwalter,
By Charles N. Butler
Attorney

Patented Dec. 5, 1922.

1,437,833

UNITED STATES PATENT OFFICE.

TRACY V. BUCKWALTER, OF CANTON, OHIO, ASSIGNOR TO TIMKEN ROLLER BEARING COMPANY, OF CANTON, OHIO, A CORPORATION OF OHIO.

ANTIFRICTION BEARING.

Application filed January 24, 1919. Serial No. 272,815.

*To all whom it may concern:*

Be it known that I, TRACY V. BUCKWALTER, a citizen of the United States, residing at Canton, in the county of Stark and State of Ohio, have invented certain Improvements in Antifriction Bearings, of which the following is a specification.

My improvements relate to anti-friction bearings adapted for use in mounting wheels on spindles, particularly the front wheels of automobiles on their spindles.

The characteristic desiderata attained by my improvements are the capacity for effecting a complete assembly of a bearing within the wheel hub prior to placing the wheel on the spindle, the provision of a simple closure fixed to the hub with its pliable interior of small diameter in frictional contact with the relatively stationary part of the bearing, with the reduction of frictional speed and grease leakage, the provision of a light movable fit of the inner bearing member on the spindle so that it will creep to distribute the load and wear, and the provision of a closed pocket for the retention of grease and the lubrication of the bearing.

The improvements are characterized by simplicity of construction and assembly of parts, the ready removal of the wheel and bearing from the spindle, and the efficiency of operation and lubrication.

Figure 1:
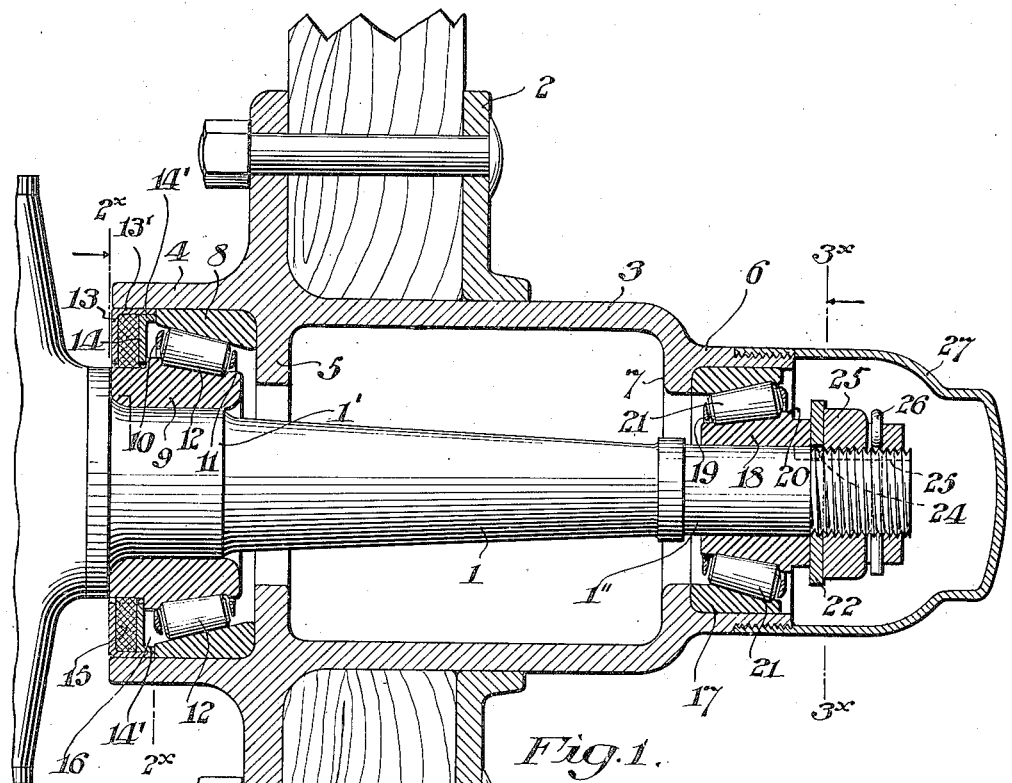
Figure 3:
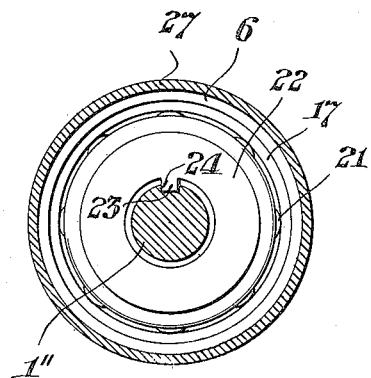
Figure 2:
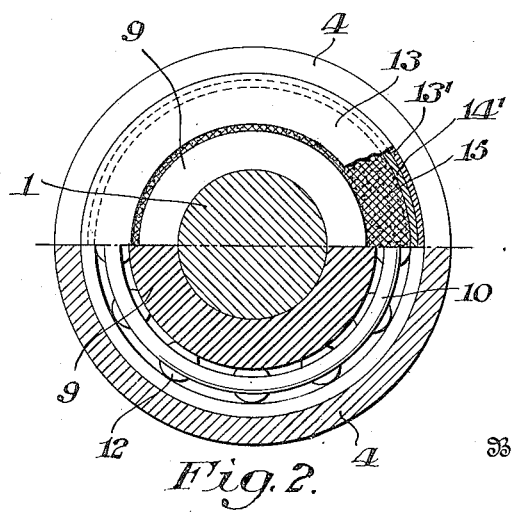

In the drawings, Fig. 1 is a broken sectional view taken through the spindle with a wheel hub mounted thereon by means of my improvements; Fig. 2 is a sectional view taken on the line $2^x$—$2^x$ of Fig. 1; and Fig. 3 is a sectional view taken on the line $3^x$—$3^x$ of Fig. 1.
The construction shown in the drawing, in illustration of my improvements, comprises a spindle 1, on which is mounted the wheel 2 having a hub 3; the latter being provided with the inner cylindrical rim 4, the adjacent inwardly projecting circular flange 5, the outer cylindrical rim 6, and the adjacent inwardly projecting flange 7.

A cone cup 8 is forced into the hub 3 within the rim 4, against the flange 5, and a cone 9, having the circular flanges 10 and 11 thereon engaging the respective ends of rollers 12 carried thereby, is inserted with the rollers thereon in the hub with the rollers in engagement with the cup.
The closure comprises an exteriorally closed shell formed by the metal rings 13—13' and 14—14', each of angular cross section, and the felt ring 15, the metal rings having their peripheral parts 13' and 14' fixed together in telescoped relation and the pliable ring or washer 15 being clamped between them. The assembled closure is forced and fixed in the hub within the rim 4, with the laterally extending peripheral flange formed by the laminated parts 13' and 14' against the cup 8, the part 14 in contact with the flange 10 and the washer 15 in contact with the outer part of the cone 9 adjacent to such flange.

A leak proof recess or pocket 16 is formed thereby for the retention of grease between the closure and the rollers and between the cup and cone, while the interior of the bearing is sealed against the introduction of dust and grit.

The cone cup 17 is pressed into the hub 3, within the rim 6, against the flange 7. The wheel 2, with its hub 3 thus equipped, is then mounted on the spindle 1, which has the enlarged inner section 1' making a creeping fit with the cone 9, which is telescoped thereon.

A cone 18, provided with the circular flanges 19 and 20 for engaging the respective ends of the conical rollers 21 mounted thereon, is then telescoped on the reduced outer end 1'' of the spindle with the rollers in engagement with the cup 17. The cone 18 is held in place by a washer 22, provided with a tongue 23, which is engaged in a channel 24 in the outer end of the spindle, and a nut 25 which is screwed on the threaded outer end of the spindle into contact with the washer, the nut being held in place by a pin 26, which passes therethrough and through the spindle.

A cap 27 is screwed on the rim 6 and closes the outer end of the hub, enclosing the adjacent bearing.

It will be understood from the foregoing that the wheel is adapted to be removed as well as placed on the spindle without disturbing the relation to the hub of the antifriction bearing members originally placed therein, that the capacity of the cones to creep on the spindle will equalize the wear and avoid the usual eccentricity of action resulting from the unequal wear; that the closely fitting relation of the periphery of the closure to the adjacent hub rim and cone retains the lubricant which would otherwise be lost by leakage and excludes dirt, and that the provision for the frictional engagement of the inner and smaller part of the felt washer of the closure with the concentric cone reduces the moving frictional contact to a minimum with the reduction of wear and the improvement of the protection afforded the bearing.

Having described my invention, I claim:

1. An antifriction bearing device comprising a shell having inwardly projecting sides and a pliable fibrous washer clamped between and extending inwardly beyond said sides, in combination with concentric bearing members and rolling anti-friction devices between said members, the inner of said concentric bearing members extending through said washer.

2. An anti-friction device comprising, in combination with a hub and a spindle, a bearing member having a circular race set in said hub, a closure provided with a pliable ring set in said hub adjacent to said member, a bearing member having a circular race mounted to turn on said spindle within said member first named and extending through said closure in contact with said ring, and rolling devices in said races between said members.

3. In an anti-friction bearing, the combination with a hub having bearing cups telescoped and fixed in the opposite ends thereof, of a spindle having bearing cones sleeved thereon in concentric relation to said cups, said cones being adapted to permit said spindle to move therethrough and one or more of said cones being adapted to turn in operation on said spindle, and a closure set in the rear of said hub adjacent to the cup therein and extending around said spindle, said closure comprising a metal shell having therein a fibrous material extending inwardly therefrom.

4. In an anti-friction bearing, the combination with a hub having inwardly extending flanges and bearing cups telescoped in the opposite ends of said hub against said flanges in tightly fitting relation, of a spindle having bearing cones sleeved thereon in concentric relation to said cups, conical rollers disposed between the respective cups and cones, and a closure comprising an interior fibrous ring and retaining shell having a laterally extending circular flange, said closure adapted to be telescoped in the rear of said hub and to have said flange engage the adjacent cup therein, said spindle being movable longitudinally through said cones and closure in their assembled relation in said hub.

In testimony whereof I have hereunto set my name this 23rd day of January, 1919.

TRACY V. BUCKWALTER.